United States Patent [19]

Phillips

[11] 4,128,990

[45] Dec. 12, 1978

[54] MULTIPLE PURPOSE TEACHING DEVICE

[76] Inventor: Velma L. Phillips, Star Rte. Box 194, Chemult, Oreg. 97731

[21] Appl. No.: 817,370

[22] Filed: Jul. 20, 1977

[51] Int. Cl.² .................................................. G04B 45/00
[52] U.S. Cl. .............................................. 58/2; 58/50 R; 58/127 R; 35/28.3
[58] Field of Search ............... 35/7 R, 8 R, 32, 28.3; 58/2, 50 R, 152 R, 126 R, 127 R

[56]  References Cited

U.S. PATENT DOCUMENTS 3,593,515  7/1971  Schockner .................................. 58/2

Primary Examiner—Robert K. Schaefer
Assistant Examiner—Vit W. Miska
Attorney, Agent, or Firm—James D. Givnan, Jr.

[57]  ABSTRACT

A color and time teaching device having a base with different colored sectors thereon. Tethered pegs of matching color are insertable into each base sector. Simulated clock on the base underside is manipulated by controls extending upwardly through the base and a base mounted post.

4 Claims, 4 Drawing Figures

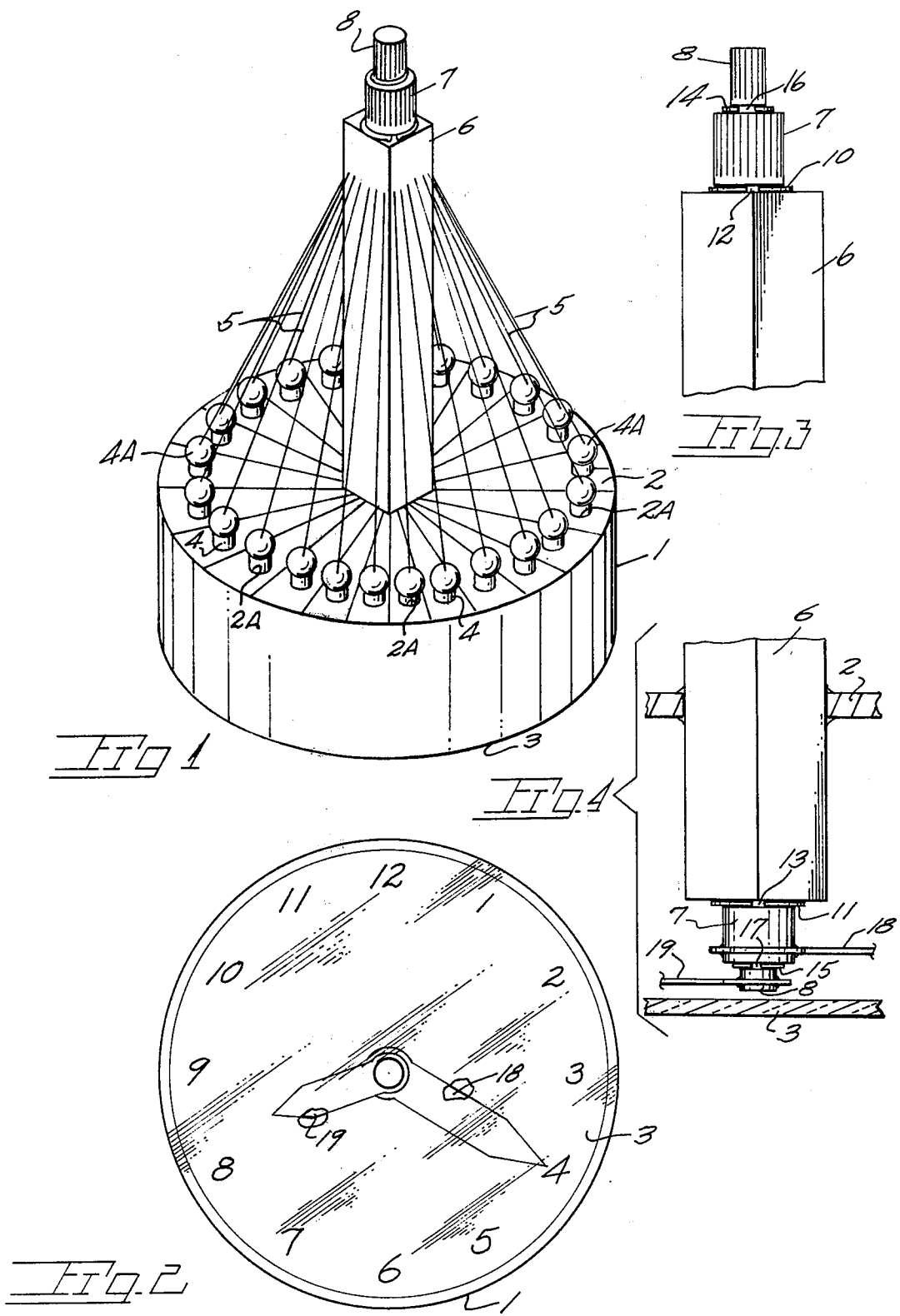

MULTIPLE PURPOSE TEACHING DEVICE

BACKGROUND OF THE INVENTION

The present invention relates to teaching aids or devices, and particularly to one for teaching both color identification and the reading time from a clock face.

In the teaching of color identification it is desirable to require the child to make close comparisons between different shades of colored articles thereby requiring careful color distinction. Previous devices requiring such color distinction consist of a myriad of parts with those of like color being joined by the child. The great number of parts contributes to the risk of part loss which, of course, reduces the effectiveness of the teaching device. A further drawback to known color teaching devices is that by reason of their numerous parts, such devices can only be used at a desk or a table of substantial area.

Known devices for teaching the telling of time include exposed hour and minute hands which are subject to damage by the child requiring costly repair or discard of the teaching aid. Further, direct manipulation of the clock hands detracts from simulation of normal clock hand movement.

SUMMARY OF THE PRESENT INVENTION

The present invention is embodied within a unitary device for teaching young children color identification as well as the telling of time.

The present device includes a circular base, the lower side of which is provided with a simulated clock face about which may be positioned hour and minute hands by means of remote hand controls. The base, upon being placed on its side, enables the instructor or child to actuate the hand controls during a teaching sequence. The base upper surface has different colored sectors, each sector receiving a tethered peg of like color. Tethering each peg is a flexible segment of cord or the like secured at its upper end to a base mounted post which arrangement prevents peg loss. Rotatably mounted within said post is a minute hand control of a tubular nature to receive an hour hand control with a minute hand and an hour hand secured to their respective lower ends.

Important objectives of the present teaching device include the provision of a device having tethered components insertable within colored areas of a base for developing the child's ability to distinguish and identify different shades of color; the provision of a teaching device wherein multiple components are tethered to prevent loss; the provision of a teaching device having an enclosed clock face about which may be positioned clock hands by finger tip actuation of hand controls; the provision of a teaching device for both color identification and the telling of time which device is of simplified, sturdy construction to withstand arduous use by children.

BRIEF DESCRIPTION OF THE DRAWING

In the accompanying drawing;

FIG. 1 is a perspective view of the present teaching device;

FIG. 2 is a bottom plan view of FIG. 1;

FIG. 3 is a fragmentary side elevational view of the upper end of a post of the device; and FIG. 4 is a fragmentary side elevational view of the lower end of the post and associated base and clock components.

DETAILED DESCRIPTION OF THE PREFERRED EMBODIMENT

With continuing attention to the accompanying drawings wherein applied reference numerals indicate parts similarly identified in the following description, the reference numeral 1 indicates the base of the present device having top and bottom surfaces at 2 and 3.

Upper surface 2 of the base is provided with a plurality of different colored areas or sectors with each sector defining an opening as at 2A for the reception of a peg 4 of a sector matching color. Each of the pegs 4 is provided with an enlarged upper end or head 4A to facilitate fingertip grasping by a child. To the exposed end of a peg 4 is a tether 5 which is of a flexible nature and of a length to provide a slight amount of slack when a peg is in its proper receptacle. The enlarged peg end 4A is colored to match a sector on the base upper surface.

Supported by the base is a centrally disposed post 6 which extends downwardly below upper surface 2 of the base for purposes of rigidity. Said post is of open construction to receive rotatably mounted clock hand control at 7 and 8.

With attention to FIGS. 3 and 4, a pair of snap rings at 10 and 11 seat within annular grooves 12 and 13 in tubular shaped control 7 to confine said control within post 6 and against axial movement while permitting rotational movement of the control. Similarly, snap rings at 14 and 15 seat within annular grooves 16 and 17 in clock hand control 8 to rotatably mount same within hand control 7 while preventing axial movement therein.

The bottom surface 3 of the base is of transparent plastic and is provided with numerals 1 through 12 to simulate the face of a clock. Interiorally of surface 3 is a minute hand 18 and an hour hand 19, each being respectively secured to the lower ends of controls 7 and 8. Accordingly, manipulation of the upper exposed ends of controls 7 and 8 imparts movement to the simulated clock hands 18 and 19 to enable the user to arrange the hands in any time indicating arrangement.

Operation of the present device is believed largely apparent from the above description. In using the device to teach colors, all the pegs are removed from their receptacles 2A and the child required to replace same which requires both color comparison and careful distinction between colors. The tethering of the pegs prevents loss of same. With the base 1 on its side, the simulated clock face is exposed to permit teaching of the telling of time with the student or teacher manipulating the clock hands by controls 7 and 8.

While I have shown but one embodiment of the invention, it will be apparent to those skilled in the art that the invention may be embodied still otherwise without departing from the spirit and scope of the claimed invention.

Having thus described the invention what is desired to be sured under a Letters Patent is:

1. A teaching device for instructing individuals in the identification of colors and in telling of time, said device comprising, a base having an upper surface with different colored areas thereon, a series of pegs insertable into said base, a centrally disposed post supported by said base, means tethering each of said pegs to said post, said base having a clock face on its underside, an hour and a minute hand in said base, and controls rotatably mounted within said post with each control having a clock hand attached to its lower end.

2. The teaching device claimed in claim 1 wherein one of said controls is tubular to receive another of said controls.

3. The teaching device claimed in claim 1 wherein the top surface of the base is comprised of different colored sectors.

4. The teaching device claimed in claim 1 wherein the hour and minute hands are disposed interiorly of the base, said base having a transparent bottom surface on which a clock face is displayed.